United States Patent Office 3,169,293
Patented Feb. 16, 1965

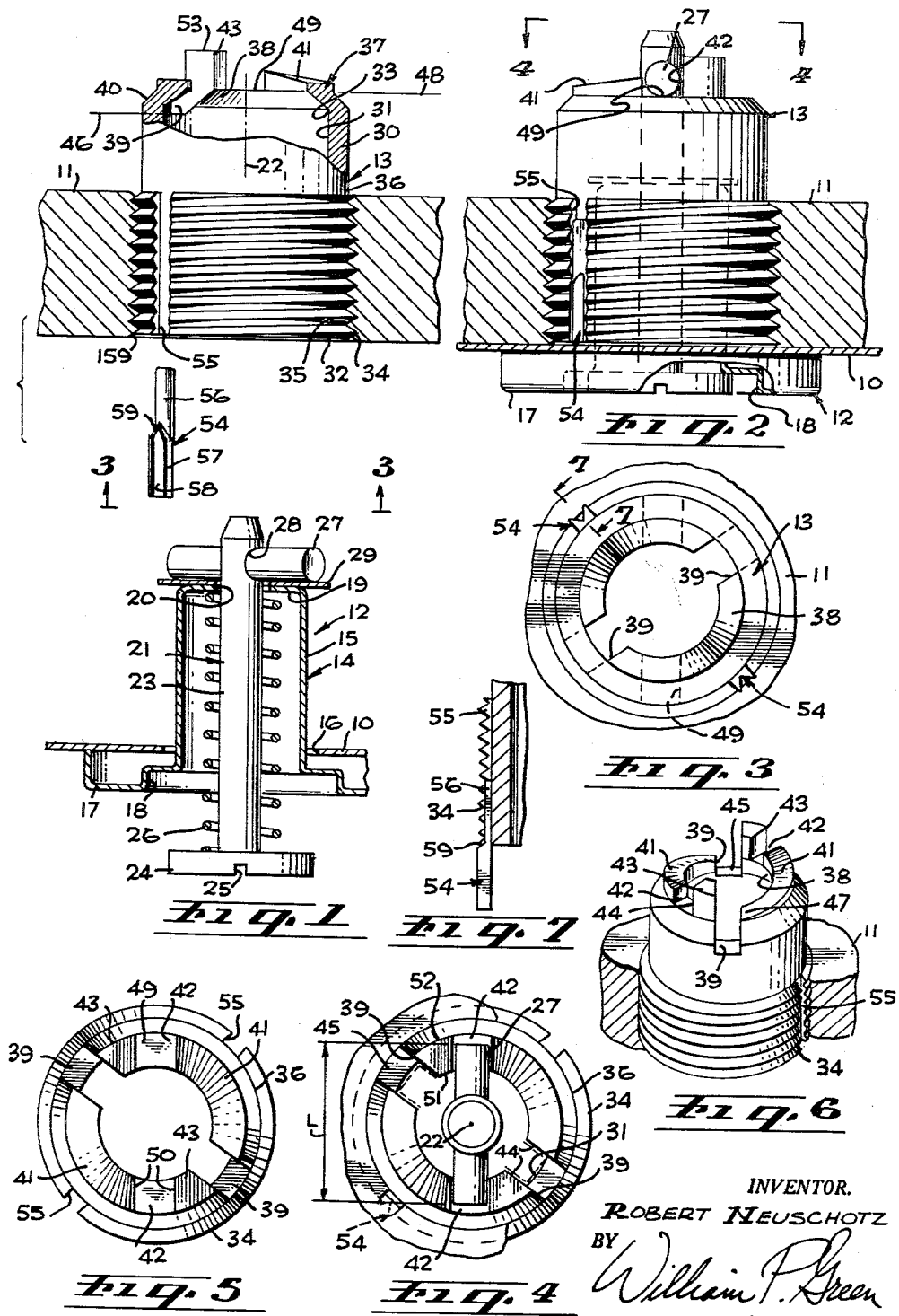

3,169,293
QUICK RELEASE FASTENER STRUCTURE
Robert Neuschotz, 1162 Angelo Drive,
Beverly Hills, Calif.
Filed July 16, 1962, Ser. No. 210,170
2 Claims. (Cl. 24—221)

This invention relates to an improved fastener structure for securing two parts together, and of a type capable of being actuated between holding and released conditions very rapidly.

There have in the past been devised various quick release fasteners of a type sometimes referred to generally as "quarter turn" fasteners, including two interengageable holding elements one of which is adapted to be moved into interfitting holding relation with respect to the other element by turning of the first part about a predetermined axis through a limited angle substantially less than 360°. In most cases, the amount of rotary movement required to interlock the parts is approximately 90°, or slightly greater than 90°.

In the past, quick release fasteners of this type have been used primarily for securing together members in the form of thin plates or sheets. This has been true because the design of the fastener parts has been such that both the rotating and nonrotating fastener elements could normally be attached only to members in thin sheet-like form.

A major object of the present invention is to provide a quick release fastener of the above discussed type in which the nonrotating fastener element is connected to the part by which it is to be carried in a manner enabling the device to be used in conjunction with other than thin sheet form members. Specifically, an element embodying the invention may be connected into a casting, or virtually any other type of mounting structure, without the necessity for attachment to that structure by means of the conventional rivets heretofore employed.

To achieve these results, I provide a nonrotating fastener element which is externally threaded, and adapted to be screwed into a mating threaded bore formed in the part by which this element is to be carried. In conjunction with the external threads on the element, there may be provided one or more locking keys capable of being actuated into positive locking engagement with the carrier member in a manner preventing relative rotation of the fastener element in response to the rotary forces exerted against that element by the coacting rotatable fastener part, in use. The latter may be adapted to extend into the externally threaded element and project beyond the threads to a location at which the rotary part is engageable with a camming and latching surface on the nonrotating element, to hold the parts in their connected relation.

The above and other features and objects of the invention will be better understood from the following detailed description of the typical embodiment illustrated in the accompanying drawing, in which:

FIG. 1 is an exploded partially sectional view representing the fastener assembly of the invention;

FIG. 2 is a side view of the FIG. 1 fastener assembly, shown in its latched or holding condition;

FIG. 3 is a view taken on line 3—3 of FIG. 1;

FIG. 4 is a view taken on line 4—4 of FIG. 2, and showing the latching element in its holding position;

FIG. 5 is a view similar to FIG. 4, but showing the latching element removed;

FIG. 6 is a perspective view of the nonrotating fastener element; and

FIG. 7 is an enlarged fragmentary section taken on line 7—7 of FIG. 3.

Referring first to FIG. 1, I have represented at 10 and 11 two members which are to be detachably secured together, in the abutting relation illustrated in FIG. 2, by interengagement of a first fastener unit 12 secured to member 10 and a second fastener element 13 attached to part 11. Member 10 may typically be considered as a sheet metal cover plate, panel, or the like, which is to be secured to the front of a mounting structure or piece of equipment of which the member 11 forms a part. Member 11 may be a relatively thick casting or other structure having considerably greater thickness than the sheet metal cover plate 10.

Unit 12 includes an annular body 14, which may be stamped from sheet metal, and which has a cylindrical portion 15 projecting through an opening 16 in member 10. At the outer side of member 10, the part 14 may form an annular flange 17 of the illustrated cross-section, and forming an annular recess 18. At its axially inner end, eleemnt 14 may be turned inwardly to form a transverse wall 19 containing an opening 20. The body part 14 is desirably a loose fit within opening 16, to allow lateral shifting movement of unit 12 to facilitate its alignment with element 13.

Within the tubular portion 15 of body part 14, assembly 12 includes a latching element 21, which is normally centered about the same axis 22 as is body part 14. Element 21 has a shank portion 23 which may be of straight cylindrical external configuration, and which terminates at its axially outer side in a circular head 24 having a transverse screw driver slot 25. A spring 26 disposed about shank 23 bears at one end against head 24 and at the opposite end against wall 19, to yieldingly urge fastener element 21 axially outwardly to its FIG. 1 position.

The axially inner end of shank 23 carries a transverse cross-piece 27, which may extend through and be a tight frictional fit within a transverse opening 28 formed in the shank, to retain parts 23 and 27 in the illustrated assembled relation. Cross-piece 27 bears axially outwardly against a washer 29, which in turn bears against end wall 19 of part 14. Washer 29 is desirably of a diameter somewhat greater than opening 16, and can not move outwardly (downwardly as seen in FIG. 1) through opening 16, so that the washer thereby movably secures unit 12 to sheet 10. The washer may be a split ring adapted to be slipped about shank 23 after unit 12 has been inserted into opening 16. Cross-piece 27 should desirably be short enough to be readily insertible through opening 16.

Referring now to the representation of the non-rotating fastener element 13 at the top of FIG. 1, the part 13 may be formed of metal, such as a suitable steel, and includes a tubular side wall 30 into which cylinder portion 15 of element 14 and the cross-piece 27 carried by fastener 21 are projectable. Internally, tubular side wall 30 preferably has a straight cylindrical inner surface 31, of a diameter somewhat greater than the external diameter of portion 15 of body part 14, and also of a diameter slightly greater than the length L (FIG. 4) of cross-piece 27. Surface 31, like the other surfaces of part 13 which will be described below, is centered about the main axis 22 of the fastener structure. Cylindrical surface 31 desirably extends through almost the entire axial length of element 13, and specifically between the two points designated 32 and 33 in FIG. 1.

Externally, the tubular side wall 30 of element 13 has a series of threads 34 adapted to be screwed into mating threads 35 formed in an opening in part 11. Axially inwardly beyond threads 34, the side wall 30 of element 13 may have an external cylindrical surface 36, centered about axis 22.

At the axially inner end of element 13, this element forms a generally transverse and generally annular end wall 37, which extends inwardly from side wall 30 in a manner forming a wall structure engageable by cross-piece 27 of fastener element 21 in a latching or holding relation. To define the structure of wall 37, it may first of all be noted that this wall has an inner tapering surface 38, centered about axis 22, and annular except to the extent that this surface is interrupted by two diametrically opposed notches 39 formed in wall 37. Radially opposite surface 38, wall 37 has an annular tapering frustoconical surface 40. The inner surface 38 may be slightly curved, as seen in FIG. 1, and be formed by the end of a conventional drill bit used for drilling the bore 31 within part 13.

Notches 39 are of a width, circularly about axis 22, sufficient to receive the opposite ends of cross-piece 27 (see the broken line position of FIG. 4), and to pass the cross-piece directly axially through notches 39 from within part 13 to a location at the outside thereof. Upon subsequent rotation of element 21 and its cross-piece 27, after passage through notches 39, the opposite ends of cross-piece 27 engage and slide along two arcuate ramp surfaces 41, which face in an axially inward direction (upwardly as viewed in FIG. 1), and which progressively advance in that axially inward direction as they advance circularly in a clockwise direction (as viewed from the bottom of FIG. 1). At the ends or ramps 41, there are formed two additional notches 42, within which the ends of cross-piece 27 are receivable in the fully latched position of FIG. 2. Beyond each notch 42, and forming one side thereof, the part 13 has two stop lugs 43 acting to positively prevent rotation of the cross-piece beyond the FIG. 2 latched position.

To define the configuration of the axially inner end of part 13 somewhat more specifically, it may first of all be noted that notches 39 are defined by two parallel opposite side surfaces or edges 44, which may be planar and extend parallel to axis 22. The two notches 39 are diametrically opposite one another, with the side surfaces 44 of one notch lying in the same planes as the corresponding surfaces of the other notch. Surfaces 44 extend into the material of part 13 from its axially inner end to the location of a pair of planar surfaces 45 lying in a common plane 46 (FIG. 1) disposed transversely of axis 22. These surfaces 44 and their plane 46 are preferably beyond surfaces 38 and 40, as will be apparent from FIGS. 1 and 6, so that the notches fully intersect the cylindrical bore formed within element 13, to provide the desired open passageway through which cross-piece 27 may move axially past wall 37.

The lower end 47 of each ramp surface 41 (see FIG. 6) may lie substantially in a transverse plane 48 (FIG. 1) which typically coincides with the axially inner edges of surfaces 38 and 40. The bottom walls 49 of locking notches 42 may also lie in this plane 48 (see FIG. 1). The opposite sides of each locking notch 49 are defined by two planar axially extending parallel side wall surfaces 50 (FIG. 5) spaced the same distance apart as surfaces 44, and adapted to receive and closely confine the ends of cross-piece 27. The stop lugs 43 have the transverse cross-section of a segment of a circle (FIG. 5) being defined at one side by one of the surfaces 44, and at the opposite side by one of the surfaces 50. The radially inner and outer sides of ramps 41 and stop lugs 43 may take the form of cylindrical surfaces 51 and 52 centered about axis 22, with the axially inner surface 53 of each stop lug 43 being planar and projecting a substantial distance axially inwardly beyond the highest portions of ramp surfaces 41.

In use, the rotatable latch element 21-27 exerts substantial turning forces against the nonrotating second fastener part 13. To prevent turning movement of element 13 about axis 22 in response to these forces exerted by element 21-27, element 13 is provided with at least one (preferably two) locking keys 54, which are received within two diametrically opposed grooves 55 extending axially along the outer side of element 13. Grooves 55 have the dove-tail cross-sectional configuration illustrated in FIGS. 3, 4 and 5, with keys 54 being guided by these grooves for only axial movement relative to element 13. Each key 54 has a thin portion 56 which is received entirely within the minor diameter of threads 34, and therefore will not interfere with screwing of part 13 into threaded bore 35. The keys 54 also have portions 57 of an increased radial thickness, which initially are received in the axially projecting position of FIG. 7, and are thick enough radially to project beyond the minor diameter of threads 34, and therefore cut into and form and interlock with threads 35 when the keys are driven axially, after element 13 has been screwed into part 11 to the FIG. 1 position. Preferably, the increased radial thickness portions 57 of the keys contain axially extending grooves 58, dividing the thicker portions 57 into two parallel axially extending knife edges or blades for cutting into the material of part 11.

Keys 56 are initially held within grooves 55 in the FIG. 7 positions by tight frictional engagement of portions 56 of the keys within the grooves. Thus, with the keys in this condition, element 13 may be screwed into bore 35 to the FIG. 2 position, with the unit being held and turned by the outwardly projecting portions 58 of the keys. The shoulders 59 formed at the inner ends of enlarged portions 57 of the keys limit the extent to which element 13 is screwed into part 11, by engagement with the edge 159 formed on part 11 at the entrance to threaded bore 35. After the assembly 13-54-54 has been installed to the FIG. 2 position, keys 54 are driven axially within grooves 55 to the locking position of FIG. 2.

When it is desired to connect assembly 12 to element 13, assembly 12 is inserted into the open end of element 13 toward the FIG. 2 position; the user then presses axially against head 24 with a screwdriver (against the tendency of spring 26), and simultaneously turns the screwdriver until cross-piece 27 mates with and passes into and through notches 39. Subsequent turning of the screwdriver in a right hand direction advances the ends of the cross-piece onto and along ramp surfaces 41, to cam or pull elements 10 and 11 tightly together, with the cross-piece ultimately falling into its FIG. 2 latched position within notches 42. The device may of course be released by pressing element 21 far enough axially to release cross-piece 27 from notches 42, and then turning element 21 in a counterclockwise direction into alignment with notches 39.

I claim:

1. A quick release fastener socket for use with a coacting spring pressed quick release stud which has a latching cross piece and is mounted for relative rotary movement about an axis and relative axial movement therealong, said socket including a tubular body having an axially inner end and an axially outer end, said body having external threads near said axially outer end for engaging mating threads in a carrier part to secure the body therein, said body containing an external groove of undercut cross section extending axially through and interrupting said threads, an axially elongated key carried in said groove in fixed position relative thereto and drivable axially therealong to cut into the threads of said carrier part to lock the socket against rotary movement in response to rotary forces exerted by said stud, said body containing an inner passage extending axially thereinto from essentially said axially outer end of the body and defined by a substantially cylindrical side wall surface having a portion located directly radially inwardly opposite said external threads, said body having a portion at said axially inner end thereof projecting axially inwardly beyond said threads and presenting an unthreaded external surface axially inwardly beyond said threads, said body forming a generally transverse wall structure at said axially inner end of the body and axially inwardly beyond said threads and extending radially inwardly beyond the diameter of said substantially cylindrical side wall surface of said passage, said transverse wall structure containing stud passing notches through which two ends of said cross piece may pass axially from an axially outer side of the wall structure to its axially inner side, said wall structure having camming ramps at said axially inner side engageable by said ends of the cross piece to cam said stud and socket axially together in response to rotary movement of said stud relative to the socket, said wall structure having locking notches at the ends of said ramps for receiving said two ends of the cross piece to retain said stud and socket in fully latched condition, said stud passing notches having radially outer portions continuing radially outwardly beyond the diameter of said inner passage to said unthreaded external surface of the body and forming interruptions in said unthreaded surface axially inwardly beyond said external threads and beyond said groove and key.

2. A quick release fastener socket for use with a coacting spring pressed quick release stud which has a latching cross piece and is mounted for relative rotary movement about an axis and relative axial movement therealong, said socket including a tubular body having an axially inner end and an axially outer end, said body having external threads near said axially outer end for engaging mating threads in a carrier part to secure the body therein, said body containing an external groove of undercut cross section extending axially through and interrupting said threads, an axially elongated key carried in said groove in fixed position relative thereto and drivable axially therealong to lock the socket against rotary movement in response to rotary forces exerted by said stud, said body containing an inner passage extending axially thereinto from essentially said axially outer end of the body and defined by a substantially cylindrical side wall surface having a portion located directly radially inwardly opposite said external threads, said body having a portion at said axially inner end thereof projecting axially inwardly beyond said threads and presenting an unthreaded external surface axially inwardly beyond said threads, said body forming a generally transverse wall structure at said axially inner end of the body and axially inwardly beyond said threads and extending radially inwardly beyond the diameter of said substantially cylindrical side wall surface of said passage, said transverse wall structure containing stud passing notches through which two ends of said cross-piece may pass axially from an axially outer side of the wall structure to its axially inner side, said wall structure having camming ramps at said axially inner side engageable by said ends of the cross piece to cam said stud and socket axially together in response to rotary movement of said stud relative to the socket, said wall structure having locking notches at the ends of said ramps for receiving said two ends of the cross piece to retain said stud and socket in fully latched condition, said stud passing notches having radially outer portions continuing radially outwardly beyond the diameter of said inner passage to said unthreaded external surface of the body and forming interruptions in said unthreaded surface axially inwardly beyond said external threads and beyond said groove and key, said unthreaded external surface having a tapering frustro-conical portion at the location of said transverse wall structure and having a cylindrical portion between said frustro-conical portion and said threads, said body having a radially inner frustro-conical surface radially opposite said frustro-conical portion of the external surface, said inner frustro-conical surface and said inner cylindrical surface and both said frustro-conical and said cylindrical portions of said external surface being interrupted by said stud passing notches.

References Cited by the Examiner
UNITED STATES PATENTS

| | | | |
|---|---|---|---|
| 2,239,125 | 4/41 | Summers | 24—221.2 |
| 2,486,411 | 11/49 | Huelster | 24—221.2 |
| 2,691,199 | 10/54 | Schlueter | 24—221.2 |
| 2,839,808 | 6/58 | Zahodiakin | 24—221.2 |
| 2,922,211 | 1/60 | Boyd | 24—221.2 |

DONLEY J. STOCKING, *Primary Examiner.*

ABRAHAM G. STONE, *Examiner.*